United States Patent
Khan et al.

(10) Patent No.: US 10,162,604 B2
(45) Date of Patent: Dec. 25, 2018

(54) NAVIGATION HISTORY VISUALIZATION IN INTEGRATED DEVELOPMENT ENVIRONMENT

(75) Inventors: Sadi Khan, Redmond, WA (US); Jens Kåre Jacobsen, Seattle, WA (US); Andrew J. Byrne, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 534 days.

(21) Appl. No.: 13/162,000

(22) Filed: Jun. 16, 2011

(65) Prior Publication Data

US 2012/0324423 A1    Dec. 20, 2012

(51) Int. Cl.
| | | |
|---|---|---|
| *G06F 8/33* | (2018.01) | |
| *G06F 8/34* | (2018.01) | |
| *G06F 8/75* | (2018.01) | |

(52) U.S. Cl.
CPC ............... *G06F 8/33* (2013.01); *G06F 8/34* (2013.01); *G06F 8/75* (2013.01)

(58) Field of Classification Search
CPC .... G06F 8/20; G06F 8/30–8/355; G06F 8/39; G06F 8/33; G06F 8/34; G06F 8/35
See application file for complete search history.

(56) References Cited

U.S. PATENT DOCUMENTS

| | | | | |
|---|---|---|---|---|
| 4,931,928 A | * | 6/1990 | Greenfeld | G06F 8/427 |
| | | | | 707/999.003 |
| 6,018,342 A | | 1/2000 | Bristor | |
| 6,993,466 B2 | * | 1/2006 | Kodosky | G06F 8/34 |
| | | | | 702/57 |
| 7,110,936 B2 | * | 9/2006 | Hiew et al. | 703/22 |
| 7,200,838 B2 | * | 4/2007 | Kodosky et al. | 717/116 |
| 7,496,830 B2 | | 2/2009 | Rubin et al. | |
| 7,694,273 B2 | * | 4/2010 | Kodosky et al. | 717/113 |
| 7,769,698 B2 | * | 8/2010 | Matic | 705/77 |
| 7,954,082 B2 | * | 5/2011 | Joffrain et al. | 717/100 |
| 7,958,486 B2 | * | 6/2011 | Tsyganskiy | G06F 8/72 |
| | | | | 715/713 |
| 8,171,428 B2 | * | 5/2012 | Ding | 715/854 |
| 8,271,943 B2 | * | 9/2012 | Hudson, III | 717/113 |
| 8,413,108 B2 | * | 4/2013 | Groves | G06F 11/3616 |
| | | | | 717/104 |
| 8,423,985 B2 | * | 4/2013 | Ishikawa | G06F 8/20 |
| | | | | 717/154 |
| 8,434,063 B2 | * | 4/2013 | Argue et al. | 717/113 |

(Continued)

OTHER PUBLICATIONS

Robert Douglas Elves, NavTracks—Helping Developers Navigate Source Code, University of Victoria, 2005, pp. 1-70.*

(Continued)

*Primary Examiner* — Benjamin C Wu
*Assistant Examiner* — Zheng Wei
(74) *Attorney, Agent, or Firm* — Dicke, Billig & Czaja, PLLC (57) ABSTRACT

An integrated development environment displays a diagram that indicates relationships between code elements navigated by a user. The diagram provides a visualization of the navigation history of the user to allow the user to understand the code structure and flow of a program. A navigation history engine extracts the navigation history, generates the diagram, and displays the diagram adjacent to code displayed by a code editor.

17 Claims, 5 Drawing Sheets

(56) References Cited

U.S. PATENT DOCUMENTS

| | | | | |
|---|---|---|---|---|
| 8,448,130 B1* | 5/2013 | Pillarisetti | G06F 8/447 | 717/104 |
| 8,453,106 B2* | 5/2013 | DeLine | G06F 8/34 | 717/104 |
| 8,522,196 B1* | 8/2013 | Kim et al. | 717/105 | |
| 8,539,378 B2* | 9/2013 | El-Nakhily et al. | 715/854 | |
| 8,561,015 B2* | 10/2013 | Rowan et al. | 717/105 | |
| 8,825,561 B2* | 9/2014 | Bellamy | G06Q 50/10 | 706/11 |
| 9,182,948 B1* | 11/2015 | O'Riordan | G05B 19/0426 | |
| 9,223,461 B1* | 12/2015 | Brown | G06F 3/0485 | |
| 9,342,276 B1* | 5/2016 | Lin | G06F 8/34 | |
| 2002/0122073 A1 | 9/2002 | Abrams et al. | | |
| 2003/0041143 A1* | 2/2003 | Ronald et al. | 709/224 | |
| 2003/0056192 A1* | 3/2003 | Burgess | G06F 8/75 | 717/100 |
| 2006/0059457 A1* | 3/2006 | Pandit | G06F 8/73 | 717/106 |
| 2006/0064674 A1* | 3/2006 | Olson et al. | 717/113 | |
| 2006/0241961 A1* | 10/2006 | Tsyganskiy | G06Q 10/067 | 717/104 |
| 2007/0061777 A1* | 3/2007 | Vashi et al. | 717/113 | |
| 2007/0192759 A1* | 8/2007 | Ishii et al. | 717/113 | |
| 2007/0268294 A1* | 11/2007 | Eagen et al. | 345/284 | |
| 2007/0277149 A1* | 11/2007 | Stevens | G06F 8/24 | 717/105 |
| 2007/0288885 A1* | 12/2007 | Brunel | G06F 8/10 | 717/104 |
| 2008/0022259 A1* | 1/2008 | MacKlem | G06F 8/34 | 717/113 |
| 2008/0316213 A1* | 12/2008 | Eagen et al. | 345/474 | |
| 2009/0024937 A1* | 1/2009 | Lauff | G06F 8/20 | 715/762 |
| 2009/0031256 A1* | 1/2009 | El-Nakhily et al. | 715/854 | |
| 2009/0055769 A1* | 2/2009 | Ding | 715/804 | |
| 2009/0125877 A1* | 5/2009 | Kuzsma, Jr. | G06F 8/34 | 717/105 |
| 2009/0150861 A1* | 6/2009 | Cowan | G06F 8/35 | 717/105 |
| 2009/0172633 A1* | 7/2009 | Tsyganskiy | G06F 8/72 | 717/104 |
| 2009/0204937 A1* | 8/2009 | Kodosky et al. | 717/104 | |
| 2009/0293044 A1* | 11/2009 | Boettcher | G06F 8/75 | 717/131 |
| 2009/0307654 A1* | 12/2009 | Ishikawa | G06F 8/20 | 717/106 |
| 2009/0319955 A1* | 12/2009 | Malek et al. | 715/854 | |
| 2010/0023926 A1* | 1/2010 | Sugawara | G06F 8/75 | 717/120 |
| 2010/0057417 A1* | 3/2010 | Hudson, III | G06F 8/34 | 703/7 |
| 2010/0251211 A1* | 9/2010 | Dutta | G06F 8/75 | 717/109 |
| 2010/0262949 A1 | 10/2010 | Jacobsen et al. | | |
| 2010/0293519 A1* | 11/2010 | Groves | G06F 11/3616 | 717/101 |
| 2011/0035343 A1* | 2/2011 | Bellamy | G06Q 50/10 | 706/11 |
| 2011/0113359 A1* | 5/2011 | Massey et al. | 715/771 | |
| 2011/0161846 A1* | 6/2011 | Dutta | G06F 8/70 | 715/763 |
| 2011/0185342 A1* | 7/2011 | Argue et al. | 717/113 | |
| 2011/0249002 A1* | 10/2011 | Duplessis | G06T 11/206 | 345/440 |
| 2012/0079447 A1* | 3/2012 | Arnott et al. | 717/101 | |
| 2012/0117537 A1* | 5/2012 | Sierk et al. | 717/113 | |
| 2012/0159452 A1* | 6/2012 | DeLine | G06F 8/34 | 717/125 |
| 2013/0204874 A1* | 8/2013 | Frey | G06F 17/30707 | 707/737 |
| 2017/0102844 A1* | 4/2017 | Brown | G06F 3/0482 | |
| 2017/0171238 A1* | 6/2017 | Milener | H04L 63/1433 | |

OTHER PUBLICATIONS

Hartmann et al., HyperSource: Bridging the Gap Bwtween Source and Code-Related Web Site, published CHI 2011, May 7-12, 2011, Vancouver, BC, Canada, pp. 2207-2210.*

Murphy et al., How Are Java Software Developers Using the Eclipse IDE?, Published by IEEE Computer Society, 2006, pp. 76-83.*

Lintern et al Plugging-in Visualization: Experiences Integrating a Visualization Tool with Eclipse, ACM Symposium on Software Visualization, pp. 47-56 and 209, 2003.*

Jeff Levinson, Inside VSTS Exploring Directed Graph Markup Language in VS2010, published by Visual Studio magazine, Mar. 11, 2010, pp. 1-4.*

Barry Burd, Eclipse for Dummies, published by Wiley Publishing, Inc, 2005 pp. 1-361.*

Singer, et al., "NavTracks: Supporting Navigation in Software Maintenance," Proceedings of the 21st IEEE International Conference on Software Maintenance, Sep. 26-29, 2005, pp. 10.

RAD Studio, "Tour of the IDE," Retrieved at <<http://docwiki.embarcadero.com/RADStudio/en/Tour_of_the_IDE, >>Retrieved Date:Dec. 27, 2010, pp. 8.

Carneiro, et al., "Proposing a Visual Approach to Support the Characterization of Software Comprehension Activities," Proceedings of the 17th IEEE International Conference on Program Comprehension, May 17-19, 2009, pp. 291-292.

Roethlisberger, et al., "Supporting task-oriented navigation in IDEs with configurable HeatMaps," Retrieved at <<http://rmod.lille.inria.fr/archives/papers/Roet09a-ICPC2009-HeatMaps.pdf>>, Proceedings of the 17th IEEE International Conference on Program Comprehension, May 17-19, 2009, pp. 253-257.

* cited by examiner

NAVIGATION HISTORY VISUALIZATION IN INTEGRATED DEVELOPMENT ENVIRONMENT

BACKGROUND

Computer programmers often work with large computer programs that are spread across numerous files. When a programmer attempts to correct a bug in a program, the programmer may struggle with understanding the code structure and flow of the program because of the size and/or complexity of the program. The programmer may traverse large swaths of code in trying to locate the bug. Although code editors may provide search tools that allow the programmer to search the code, the programmer may get lost in the code when different searches are performed.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An integrated development environment displays a diagram that indicates relationships of code elements navigated by a user. The diagram provides a visualization of the navigation history of the user to allow the user to understand the code structure and flow of a program. A navigation history engine extracts the navigation history, generates the diagram, and displays the diagram adjacent to code displayed by a code editor.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1A:
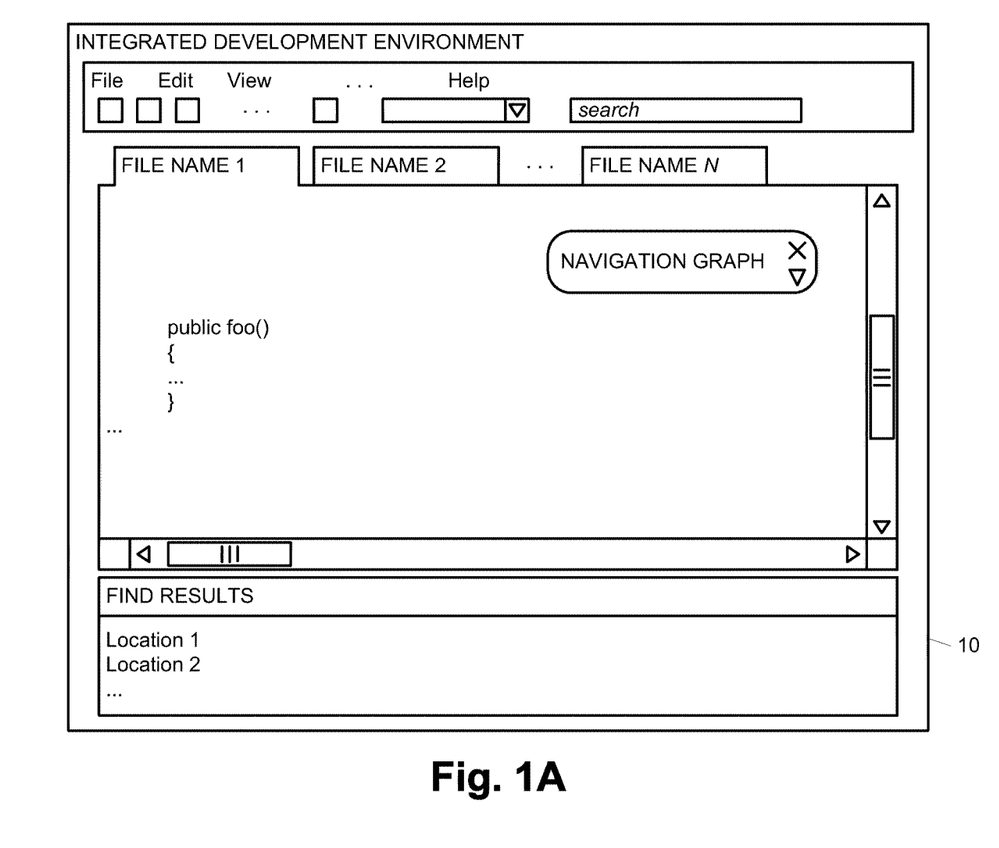
FIGS. 1A-1B are block diagrams illustrating embodiments of an integrated development environment (IDE) with navigation tracking.
Figure 1B:
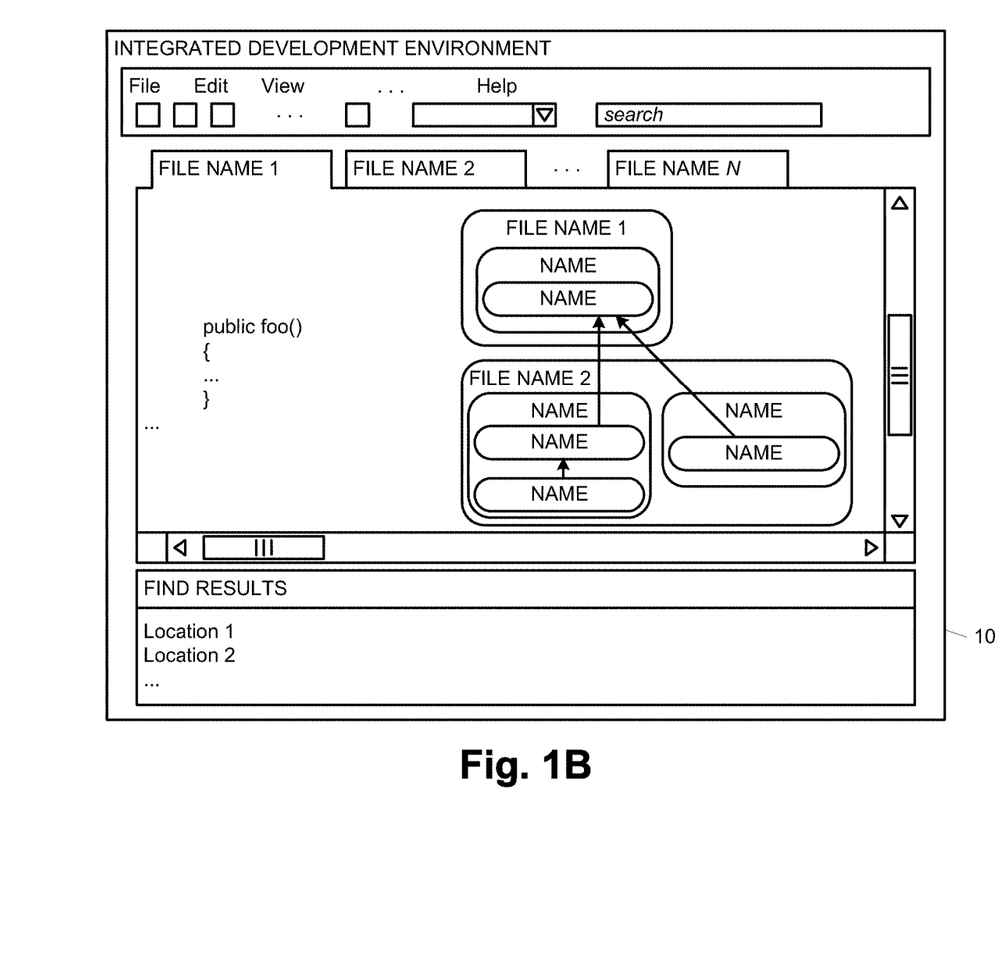

FIGS. 1A-1B are block diagrams illustrating embodiments of an integrated development environment (IDE) 10 with navigation tracking IDE 10 occurs in a runtime mode of operation in one or more computer systems, such as a computer system 100 illustrated in FIG. 2 and described in additional detail below, where the computer system or systems are executing instructions. A kernel of the computer system or systems and additional runtime libraries generate a runtime environment that executes IDE 10.

IDE 10 is executable by the computer system to provide tools for software development in one or more programming languages. The tools may include but are not limited to a source code editor, a source code analyzer, a compiler and/or interpreter, a debugger, a profiler, a version controller, a class browser, and/or an object inspector. The tools may also include tools to automate the building of a complete program from libraries and other components and/or tools to help create a graphical user interface. IDE 10 supports one or more programming languages and is used by a developer to write, execute, debug, and/or analyze programs.

Figure 2:
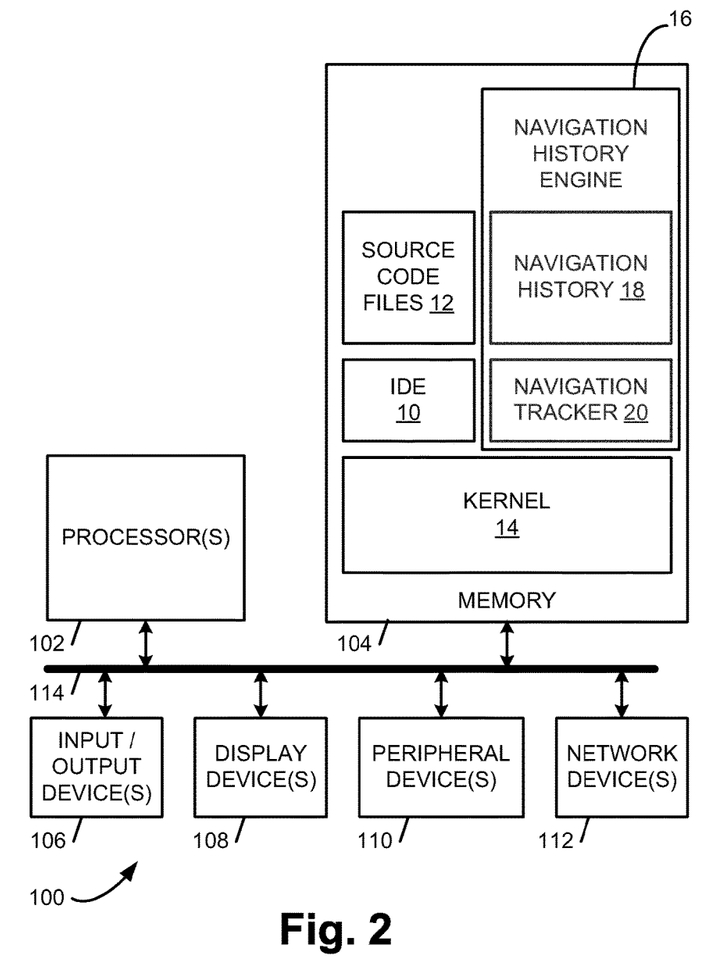
FIG. 2 is a block diagram illustrating an embodiment of a computer system configured to implement an IDE with navigation tracking

FIG. 2 is a block diagram illustrating an embodiment of a computer system 100 configured to execute IDE 10. Computer system 100 includes one or more processor packages 102, a memory system 104, zero or more input/output devices 106, zero or more display devices 108, zero or more peripheral devices 110, and zero or more network devices 112. Processor packages 102, memory system 104, input/output devices 106, display devices 108, peripheral devices 110, and network devices 112 communicate using a set of interconnections 114 that includes any suitable type, number, and configuration of controllers, buses, interfaces, and/or other wired or wireless connections.

Computer system 100 represents any suitable processing device configured for a general purpose or a specific purpose. Examples of computer system 100 include a server, a personal computer, a laptop computer, a tablet computer, a personal digital assistant (PDA), a mobile telephone, and an audio/video device. The components of computer system 100 (i.e., processor packages 102, memory system 104, input/output devices 106, display devices 108, peripheral devices 110, network devices 112, and interconnections 114) may be contained in a common housing (not shown) or in any suitable number of separate housings (not shown).

Processor packages 102 each include one or more execution cores. Each execution core is configured to access and execute instructions stored in memory system 104. The instructions may include a basic input output system (BIOS) or firmware (not shown), IDE 10, source code files 12, kernel 14, and navigation history engine 16. Navigation history engine 16 includes navigation history 18 and navigation tracker 20. In one embodiment, IDE 10 includes navigation history engine 16. Each execution core may execute the instructions in conjunction with or in response to information received from input/output devices 106, display devices 108, peripheral devices 110, and/or network devices 112.

Computer system 100 boots and executes kernel 14. Kernel 14 includes instructions executable by execution cores to manage the components of computer system 100 and provide a set of functions that allow programs, including IDE 10, source code files 12, and navigation history engine 16 to access and use the components. Kernel 14 and any additional runtime libraries generate a runtime environment to allow IDE 10, source code files 12, and navigation history engine 16 to be executed. In one embodiment, kernel 14 is the Windows operating system. In other embodiments, kernel 14 is another operating system suitable for use with computer system 100.

Memory system 104 includes any suitable type, number, and configuration of volatile or non-volatile storage devices configured to store instructions and data. The storage devices of memory system 104 represent computer readable storage media that store computer-executable instructions. The instructions are executable by computer system 100 to perform the functions and methods described herein. Memory system 104 stores instructions and data received from processor packages 102, input/output devices 106, display devices 108, peripheral devices 110, and network devices 112. Memory system 104 provides stored instructions and data to processor packages 102, input/output devices 106, display devices 108, peripheral devices 110, and network devices 112. Examples of storage devices in memory system 104 include hard disk drives, random access memory (RAM), read only memory (ROM), flash memory drives and cards, and magnetic and optical disks.

Input/output devices 106 include any suitable type, number, and configuration of input/output devices configured to input instructions or data from a user to computer system 100 and output instructions or data from computer system 100 to the user. One or more input/output devices 106 may be configured to allow a user to interact with IDE 10, source code files 12, kernel 14, and navigation history engine 16. Examples of input/output devices 106 include a keyboard, a mouse, a touchpad, a touchscreen, buttons, dials, knobs, and switches.

Display devices 108 include any suitable type, number, and configuration of display devices configured to output textual and/or graphical information to a user of computer system 100. One or more display devices 108 may be configured to output visual format, such as visual format for IDE 10 illustrated in FIGS. 1A-1B, to a user. Examples of display devices 108 include a monitor, a display screen, and a projector.

Peripheral devices 110 include any suitable type, number, and configuration of peripheral devices configured to operate with one or more other components in computer system 100 to perform general or specific processing functions.

Network devices 112 include any suitable type, number, and configuration of network devices configured to allow computer system 100 to communicate across one or more networks (not shown). Network devices 112 may be configured to allow execution data to be transmitted to or received from another computer system (not shown) or storage device (not shown). Network devices 112 may operate according to any suitable networking protocol and/or configuration to allow information to be transmitted by computer system 100 to a network or received by computer system 100 from a network.

Figure 3:
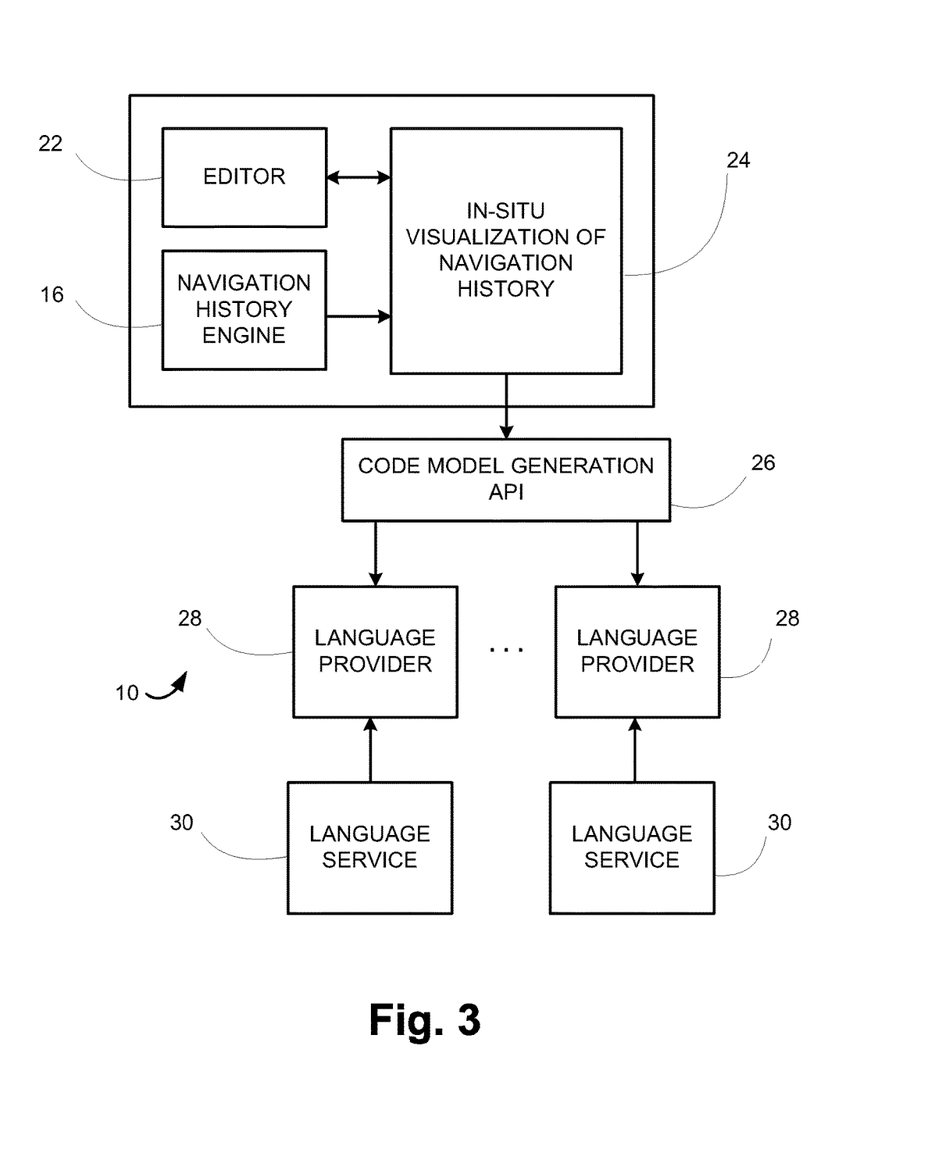
FIG. 3 is a block diagram illustrating an embodiment of data flow in an IDE with navigation tracking

FIG. 3 is a block diagram illustrating an embodiment of data flow in an IDE 10 with navigation tracking IDE 10 includes a navigation history engine 16 and a code editor 22. Navigation history engine 16 extracts navigation history, generates a diagram, and displays the diagram as in-situ visualization of navigation history 24 adjacent to code displayed with code editor 22. The diagram indicates relationships of at least two code elements navigated by a user. In one embodiment, source code 12 includes the at least two code elements navigated by the user and navigation history engine 16 displays the diagram in conjunction with code editor 22 that displays at least a portion of source code 12. The diagram provides a visualization of the navigation history of the user to allow the user to understand the code structure and flow of a program.

In one embodiment, in-situ visualization of navigation history 24 is provided to a code model generation application programming interface (API) 26 (e.g., a progression model API). Code model generation API 26 communicates with one or more language providers 28, which communicate with a corresponding language service 30. Examples of language providers include C#, visual basic (VB) providers, or any other suitable programming language provider. For each given code element, navigation history engine 16 calculates a parent hierarchy employing a suitable available language service 30. For example, navigation history 16 uses a C# language service 30 for a C# code element and uses a VB language service for a VB code element.

Figure 4:
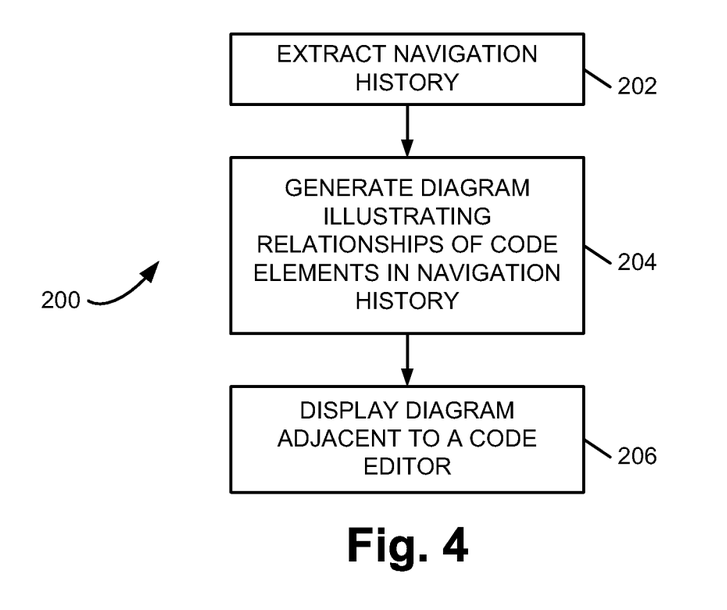
FIG. 4 is a flow chart illustrating an embodiment of a method for presenting navigation tracking in an IDE.

FIG. 4 is a flow chart illustrating an embodiment of a method 200 for presenting navigation tracking in an IDE. At 202, navigation history is extracted by a navigation history engine (e.g., navigation engine 16). The navigation engine includes a navigation tracker (e.g., navigation tracker 20) which tracks navigation history (e.g., navigation history 18) of a user.

At 204, a diagram is generated by an IDE (e.g., IDE 10) that illustrates relationships of at least two code elements in the navigation history. The diagram provides a visualization of the navigation history to the user. In one embodiment, the visual representation of navigation history is automatically generated based on navigation history being tracked inside the IDE. In one embodiment, the automatic generation of a visual representation of navigation history is provided by integrated navigation assets in the IDE, such as code reference navigation and/or code definition navigation (e.g., Find All References and/or Go To Definition commands). In one example, elements from a Task-Based Management feature of the IDE are employed that can track which files were recently opened/used etc.

At 206, the IDE displays the diagram adjacent to code displayed by a code editor of the IDE. In one embodiment, the IDE displays the diagram in-situ in the code editor to allow the user to see the diagram side-by-side with the code and actually use the diagram to navigate to previous items. The diagram provides a user selectable visual representation that is responsive to user input to navigate the user to selected code elements. In one embodiment, the user can use the diagram to navigate to sibling/parent code elements. For example, a user can double click on nodes and/or links to navigate to sibling/parent code elements. In one embodiment, the diagram moves to be displayed in-situ in the code editor to whatever file is being viewed.

In one embodiment, the diagram is a directed graph markup language (DGML) diagram. DGML is an extensible markup language (XML) based file format for directed graphs. A directed graph is a set of nodes connected by links. The nodes and links are graph elements. The DGML diagram can use XML to visualize the navigation history (i.e., historical context of items that have been navigated) of the user and analyze the navigation history. In one embodiment, the DGML diagram provides for each item, visualization of the item's parent chain (i.e., where the item is located relative to other high-level parents). In one embodiment, the DGML diagram provides for each item, visualization of siblings of the item that have a high-level of importance.

In one embodiment, the DGML diagram provides the user with a visual representation of the navigation history that can be navigated in IDE 10. For example, double clicking on certain elements in DGML diagram can actually take the user to the selected code elements in the code editor of IDE 10.

In one embodiment, navigation history engine 16 generates a visualization of the relationship between code elements including node-link container representation. In one embodiment, the DGML diagram provides the user with a visual representation of item context of the navigation history not just historical context. For example, a method also has the method's containing class, namespace, and/or assembly.

In one embodiment, the DGML diagram provides the user with a visual representation of the context around the item (e.g., for a given method, other methods also in that class that are either called by, or calling the method, and for a class, other classes that have a code dependency relationship with this class etc).

In one example of extracting the navigation history at 202, code elements (e.g., classes, methods, fields, namespaces etc.) become nodes in the DGML diagram.

In one example, Go To Definition and/or Find All References commands in the code editor of IDE 10 are utilized by the user to explore large swaths of code. After a selected number (e.g., 3) Go To Definition and/or Find All References commands, a navigation icon is triggered in the DGML diagram. In one example, after user has some selected number (e.g., 7) elements in the navigation history based on Go To Definition and/or Find All References commands, navigation history is displayed in the DGML diagram. In one example, a F12 keyboard shortcut invokes a Go To Definition command. In this example, the Go To Definition command works on types, members, locals, range variables, etc. The Go To Definition command uses a compiler's internal understanding of the code to make sure it takes the user to the right member, even when there are many overloads or if the user's code is using a lot of type inference. The Go To Definition command can also use previously visited overloads (i.e., the user's historical navigation preferences).

Other examples for adding items to the DGML diagram in the code editor of IDE 10 include Ctrl+2, Ctrl+ (on top of the Shift+Ctrl +~on an ENU keyboard), drag & drop, scroll to and click on, right click, keyboard shortcut, and source-assist window.

In one example, data for the navigation history is collected by the navigation history engine and/or existing runtime environment data is leveraged to obtain the navigation history data. In one embodiment, the navigation history engine collects only methods and fields of Go To Definition and/or Find All References commands.

In one example of generating a diagram that illustrates relationships of code elements in the navigation history at 204, a DGML diagram is generated with appropriate qualified identifiers (QID) representing the items that have been navigated.

First, relationships between code elements are determined. A navigation history engine (e.g., navigation history engine 16) is employed that can take the navigation history of a user from IDE 10 and generate a DGML diagram. In one embodiment, navigation history engine 16 transforms a code element to a QID, queries a provider for the code element, and creates a node for that code element (e.g., method, class, etc.). In one embodiment, for each of these code elements, navigation history engine 16 calculates a parent hierarchy using the language service(s) available (e.g., for a C# code element—use a C# language service and for a visual basic (VB) code element—use a VB language service). In this way, methods can also have their container classes and namespaces as nodes in the diagram.

For each such code element that the user has navigated to, one embodiment of IDE 10 provides a Find All References search across providers (using the language service) to find if there are other code elements related to that code element that the user navigated to. This embodiment of IDE 10 can give the user more context and other possible avenues that the user might want to navigate. One embodiment of IDE 10 utilizes Find All References actions/queries that are exposed by the language services.

One embodiment of IDE 10, facilitates navigation graph control with a control bar on the DGML diagram that includes user selectable commands (e.g., clear command to clear navigation history and open full window command that opens the DGML diagram in a full window DGML document).

In one embodiment of IDE 10, when a user selects a method that is not obviously related to the code (e.g., separate file, more than one hop way, etc) a question mark (?) appears on the link when the selected item is added to the DGML diagram. If the user does not click on the question mark (?), the link and the question mark (?) will disappear to leave only the unattached node. When the user clicks on the question mark (?), multiple possible paths on the DGML diagram are filled in.

In one embodiment of IDE 10, reference links are created in the direction of code. In one example, a user employs Find All References to navigate in the DGML diagram and the reference links are in the direction of the actual references in the code but in the opposite direction of the user's navigation using Find All References. In one embodiment of IDE 10, however, layout of the nodes is in the direction of navigation. This embodiment ensures that the visuals appear where the user would expect them.

In one embodiment of navigation history engine 16, when a user navigates to a new item, the diagram automatically updates (i.e., a listener is attached to the navigation history) and any changes to the navigation history cause a notification to update the diagram with new nodes/links/containers. One embodiment of navigation history engine 16 provides an incremental layout engine, which can ensure the relative positions of most items will remain fairly stable and nodes and links are laid out where the user expects them.

Embodiments of IDE 10 can minimize visual noise and facilitate user focus on the code editor. In one embodiment, the DGML diagram includes a sufficient number of shapes in the directed graph to be helpful yet not too many shapes that could cause a user to get lost in the side-by-side display of code and DGML diagram in-situ in the code editor. In one embodiment, user preferences are employed with filtering that allows the user to specify the kind of intelligent noise reduction the user desires, such as hide namespaces, hide overloads, etc.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method performed by a computer system, the method comprising:
    tracking, with a navigation history engine, a navigation history of code elements navigated by a user of a code editor;
    generating, using the navigation history and responsive to first and second code elements being navigated by the user, a diagram that indicates a relationship between the first and second code elements contained in one file, the diagram including node-link representations of the first and second code elements and providing a user selectable visual representation of the first and second code elements that is responsive to user input to navigate to a selected one of the first and second code elements contained in the one file, including a visual representation of context around the node-link representation of the first and second code elements that have a code dependency relationship with the first or second code element;
    displaying the diagram in conjunction with the code editor displaying at least a portion of the source code containing the first and second code elements; and
    automatically updating the diagram based on an updating of the navigation history.

2. The method of claim 1 wherein the displaying of the diagram comprise:
    displaying respective parent code elements for the first and second code elements.

3. The method of claim 1, wherein the displaying of the diagram comprises:
    displaying respective sibling code elements of the first and second code elements.

4. The method of claim 3 wherein the respective siblings code elements of the first and second code elements have a high-level of importance.

5. The method of claim 1, wherein the displaying of the diagram comprises:
    displaying item context and historical context of the navigation history of the first and second code elements.

6. The method of claim 1, wherein the visual representation of context comprises, for a given method, other methods also in that class are either called by, or calling the method.

7. The method of claim 1, wherein the visual representation of context comprises, for a class, other classes that have a code dependency relationship with the class.

8. The method of claim 1 wherein the selectable visual representations is responsive to user input to fill in multiple possible paths on the diagram.

9. The method of claim comprising:
    generating, using the navigation history and responsive to third and fourth code elements being navigated by the user, a diagram that indicates a relationship between the third and fourth code elements contained in at least two files, the diagram including node-link representations of the third and fourth code elements and providing a user selectable visual representation of the third and fourth code elements that is responsive to user input to navigate to a selected one of the third and fourth code elements contained in the at least two files, including a visual representation of context around the node-link representation of the third and fourth code elements that have a code dependency relationship with the third or fourth code element.

10. A computer readable storage device, which does not include transitory propagating signals, storing computer-executable instructions for controlling a computer system to perform a method comprising:
    tracking, with a navigation history engine, a navigation history of code elements navigated by user of a code editor; and
    generating, using the navigation history and responsive to at least two code elements being navigated by the user, a diagram that indicates a relationship between the at least two code elements contained in one file, the diagram including node-link representations of the at least two code elements and providing a user selectable visual representation of the at least two code elements that is responsive to user input to navigate to a selected one of the at least two code elements contained in the one file, including a visual representation o f context around the node-link representation of the at least two code elements that have a code dependency relationship with a least one of the at least two code elements;
    displaying the diagram in conjunction with the code editor displaying at least a portion of the source code containing the at least two code elements: and
    automatically updating the diagram based on an updating of the navigation history.

11. The computer readable storage device of claim 10, wherein the method comprises:
    displaying respective parent code elements for the at least two code elements.

12. The computer readable storage device of claim 10, wherein the method comprises:
    tracking, with a navigation history engine, a navigation history of code elements navigated by a user of a code editor; and
    providing for the at least two code elements visualization of displaying respective siblings code elements of the at least two code elements.

13. The computer readable storage device of claim 10 comprising:
    generating, using the navigation history and responsive to at least two code elements contained in at least two files being navigated by the user, a diagram that indicates a relationship between the at least two code elements contained in the least two files, the diagram including node-link representations of the at least two code elements contained in the at least two files
    and providing a user selectable visual representation of the at least two code elements contained in the at least two files that is responsive to user input to navigate to a selected one of the at east two code elements contained in the at least two files, including a visual representation of context around the node-link representation of the at least two code elements contained in the at least two files that have a code dependency relationship with at least one of the at least two code elements contained in the at least two files.

14. A computer readable storage device, which does not include transitory propagating signals, storing computer-executable instructions including an integrated development environment for controlling a computer system to perform a method comprising:
    displaying, with a code editor, at least a portion of source code;

extracting a navigation history of code elements navigated by a user of the code editor;

generating, using the navigation history and responsive to at least two code elements being navigated by the user, a diagram that indicates a relationship between the at least two code elements contained in one file, the diagram including node-link representations of the at least two code elements and providing a user selectable visual representation of the at least two code elements that is responsive to user input to navigate to a selected one of the at least two code elements contained in the one file, including a visual representation of context around the node-link representation of the at least two code elements that have a code dependency relationship with at least one of the at least two code elements;

displaying the diagram in-situ with the code editor displaying the at least a portion of source code containing the at least two code elements: and automatically updating the diagram based on an updating of the navigation history.

15. The computer readable storage device of claim 14 wherein the diagram
is a directed graph markup language (DGML) diagram.

16. The computer readable storage device of claim 14, wherein the method comprises:
facilitating navigation graph control with a control bar on the diagram that includes user selectable commands.

17. The computer readable storage device of claim 14 comprising:
generating, using the navigation history and responsive to at least two code elements contained in at least two files being navigated by the user, a diagram that indicates a relationship between the at least two code elements contained in the at least two files, the diagram including node-link representations of the at least two code elements contained in the at least two files and providing a user selectable visual representation of the at least two code elements contained in the at least two files that is responsive to user input to navigate to a selected one of the at least two code elements contained in the at least two files, including a visual representation of context around the node-link representations of the at least two code elements contained in the at least two files that have a code dependency relationship with at least one of the at least two code elements contained in the at least two files.

\* \* \* \* \*